US011474724B2

(12) United States Patent
Wang et al.

(10) Patent No.: US 11,474,724 B2
(45) Date of Patent: Oct. 18, 2022

(54) SYSTEM AND METHOD FOR SPEED UP DATA REBUILD IN A DISTRIBUTED STORAGE SYSTEM WITH LOCAL DEDUPLICATION

(71) Applicant: VMware, Inc., Palo Alto, CA (US)

(72) Inventors: Wenguang Wang, Santa Clara, CA (US); Christos Karamanolis, Los Gatos, CA (US); Srinath Premachandran, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 70 days.

(21) Appl. No.: 15/880,391

(22) Filed: Jan. 25, 2018

(65) Prior Publication Data

US 2019/0227727 A1 Jul. 25, 2019

(51) Int. Cl.
*G06F 3/06* (2006.01)
*G06F 12/10* (2016.01)

(52) U.S. Cl.
CPC ............ *G06F 3/0641* (2013.01); *G06F 3/065* (2013.01); *G06F 3/067* (2013.01); *G06F 3/0608* (2013.01); *G06F 3/0611* (2013.01); *G06F 12/10* (2013.01); *G06F 2212/1024* (2013.01)

(58) Field of Classification Search
CPC ....................................................... G06F 3/06
USPC ......................................................... 711/165
See application file for complete search history.

(56) References Cited

U.S. PATENT DOCUMENTS

| 9,606,870 B1* | 3/2017 | Meiri ................. G06F 3/0661 |
| 2004/0162953 A1* | 8/2004 | Yoshida ............... G06F 16/174 |
| | | 711/153 |
| 2010/0011368 A1* | 1/2010 | Arakawa ................. G06F 3/067 |
| | | 718/104 |
| 2013/0332558 A1* | 12/2013 | Condict .............. G06F 12/0815 |
| | | 709/214 |
| 2014/0195725 A1* | 7/2014 | Bennett ................... G06F 12/06 |
| | | 711/103 |
| 2016/0350324 A1 | 12/2016 | Wang et al. |

OTHER PUBLICATIONS

Louisiana Tech University. Operating Systems Concepts, Chapter 8 (2005) (Year: 2005).*
Warford, J. S. (2005). Computer Systems. United States: Jones and Bartlett Pub. (ISBN 9780763732394) (Year: 2005).*
Webster Dictionary (Year: 2021).*

* cited by examiner

*Primary Examiner* — Michael Krofcheck
(74) *Attorney, Agent, or Firm* — Fish & Richardson P.C.

(57) ABSTRACT

A method includes obtaining a plurality of representations corresponding respectively to a plurality of blocks of data stored on a source node. A plurality of data pairs are sent to a destination node, where each data pair includes a logical address associated with a block of data from the plurality of blocks of data and the corresponding representation of the block of data. A determination is made whether the blocks of data associated with the respective logical addresses are duplicates of data stored on the destination node. In accordance with an affirmative determination, a reference to a physical address of the block of data stored on the destination node is stored. In accordance with a negative determination, an indication that the data corresponding to the respective logical address is not a duplicate is stored. The data indicated as not being a duplicate is written to the destination node.

32 Claims, 8 Drawing Sheets

SYSTEM AND METHOD FOR SPEED UP DATA REBUILD IN A DISTRIBUTED STORAGE SYSTEM WITH LOCAL DEDUPLICATION

BACKGROUND

Distributed systems allow multiple clients in a network to access a pool of shared resources. For example, a distributed storage system allows a cluster of host computers to aggregate local disks (e.g., SSD, PCI-based flash storage, SATA, or SAS magnetic disks) located in or attached to each host computer to create a single and shared pool of storage. This pool of storage (sometimes referred to herein as a "datastore" or "store") is accessible by all host computers in the cluster. Storage clients in turn, such as virtual machines spawned on the host computers may use the datastore, for example, to store virtual disks that are accessed by the virtual machines during their operation. Because the shared local disks that make up the datastore may have different performance characteristics (e.g., capacity, input/output per second or IOPS capabilities, etc.), usage of such shared local disks to store virtual disks or portions thereof may be distributed among the virtual machines based on the needs of each given virtual machine. This approach provides enterprises with cost-effective performance. For instance, distributed storage using pooled local disks is inexpensive, highly scalable, and relatively simple to manage.

Data redundancy is a common technique applied in distributed storage systems. In a data redundancy scheme, each block of data is stored in more than one physical storage location. In the event that one of the physical storage locations fails, data redundancy reduces the impact of applications that rely on the data stored in the failed physical storage location since there is a copy of the data stored somewhere else. For example, in a RAID 1 configuration, there are two mirrored copies (e.g., mirrors) of each object (e.g., virtual disk). Each object is further striped in a RAID 0 configuration, where each stripe (e.g., data partition of the virtual disk) is stored on a different physical storage location than the corresponding stripe in the mirror. A system can provide metadata for each stripe that provides a mapping to or otherwise identifies a particular node that houses the physical storage resources that actually store the stripe (as well as the location of the stripe within such physical resource).

For example, if an administrator creates a storage profile or policy for a composite object, such as virtual disk object that has multiple components, a system can apply a variety of heuristics and/or distributed algorithms to generate a storage configuration that meets or otherwise suits the storage policy (e.g., RAID configuration to achieve desired redundancy through mirroring and access performance through striping, which nodes' local storage should store certain portions/partitions/stripes of the virtual disk to achieve load balancing, etc.). While using RAID configurations is one technique to organize a storage configuration, other techniques may be utilized including, without limitation, use of erasure codes and other similar techniques.

Related to data redundancy is the concept of data synchronization. Data synchronization is the process of establishing consistency among data from a source to a target (or destination) data storage and vice versa and the continuous harmonization of the data over time. When a storage cluster experiences a failure, data on the storage cluster that is lost or becomes unavailable due to the failure is resynchronized to effectively rebuild the affected data. Resynchronization is the process of replicating any data that does not have a sufficient number of copies (based on the storage policy of the system) after there is a failure.

Examples of a failure include a loss of network connection, power failure, software bug, or anything that makes a node (e.g., a disk, server, host computer, etc.) stop working. After a failure, a copy of the data affected by the failure is replicated (e.g., mirrored) from an existing copy that is not affected by the failure. For instance, a system may implement a policy of maintaining a "failure to tolerate" (FTT) of a particular number—the number of failures that can be tolerated while still guaranteeing that at least one copy of a piece of data will be available. For an FTT of one, a system needs at least two copies of each piece of data to guarantee that a copy of the data will be available in the event of one single failure.

Many distributed storage systems (e.g., vSAN by VMware, Inc.) resynchronize data by reading blocks of data from a source node and then writing the blocks of data to a destination node. However, simply copying the data from the source node to the destination node can result in significant data redundancy, as many blocks of data include the same content. Accordingly, some content will be unnecessarily copied multiple times, which slows down the resynchronization process.

Data deduplication is a technique for optimizing space usage in a storage system by eliminating redundant data. For example, if a storage system contains one hundred storage objects 01-0100 that each include an identical block of data B, data deduplication enables only one copy of B to be retained on the physical storage device(s) of the system. In this example, each storage object 01-0100 is configured to point to the single copy of B (rather than including a redundant copy of the data), thereby reducing the storage footprint of the objects.

Data deduplication is typically performed in either an inline or post-process manner. With the inline approach, data destined for storage is deduplicated as part of the input/output (I/O) data path, prior to being written to disk. With the post-process approach, data is written to disk first and then processed at a later time (typically via a background thread/process) in order to identify and remove duplicate data blocks from storage. The inline approach is generally more efficient in terms of storage space and storage bandwidth utilization than the post-process approach, since data redundancies are eliminated before reaching the disk and no further I/O is required for deduplication purposes after the data is written. However, a significant disadvantage of the inline approach is that it increases the amount of CPU work that is needed per write request, resulting in higher write latency and lower data throughput. This can degrade the I/O performance of certain client workloads and can potentially bottleneck the I/O performance of highly-parallel, low-latency storage devices.

Post-process data deduplication avoids the per-I/O performance penalty of inline deduplication by moving deduplication processing out of the I/O data path. However, the post-process approach requires more storage space in order to temporarily hold duplicate copies of data until they are detected and eliminated via post-processing. In addition, post-process data deduplication results in I/O amplification—in other words, the execution of additional I/O against storage beyond the I/O initiated by storage clients. This additional I/O (which arises from the need to read the data previously written, calculate fingerprint(s) based on the data, and update logical-to-physical block mappings if appropriate) can adversely affect the performance of client workloads that are being concurrently run against the storage system.

SUMMARY

The present disclosure describes techniques for performing data deduplication. The techniques use content-based data deduplication, which takes into account the content of the data being written to storage, and in particular in the context of data resynchronization for copying data from a source node to a destination node in the event of a failure in the system.

Fast resynchronization after a failure is important in distributed storage systems because the system is in a degraded mode, and thus more vulnerable to further failures, until resynchronization is complete. For example, in a system having a failure to tolerate of 1, if a second failure occurs during resynchronization, and that failure affects the remaining copy of the data that was affected by the first failure, then the data is no longer available, and possibly lost. The longer it takes to resynchronize after a failure, the more likely it is that there will be another failure and data will be lost. On the other hand, there are disadvantages to resynchronizing a large amount of data too quickly. Resynchronization, like other processes, requires computational and storage resources, and if performed too quickly, can consume enough bandwidth to degrade (e.g., slow down or delay) other operations. Deduplication exacerbates this issue due to the additional resources that it requires (e.g., calculating and/or comparing hash values, as described below).

Accordingly, there is a need for techniques that reduce the time and resource consumption required to resynchronize data. Some embodiments described in this document address this problem using a two-part deduplication process. In part one, according to some embodiments, in response to a node failure, the system identifies data to be resynchronized by identifying data stored on a source node that was replicated on the failed node. The system determines a destination node and selects at least a portion of the identified data for replication onto the destination node (the system may select other nodes for other portions of the data). The system sends to the destination node a batch of data pairs corresponding to at least a portion of the data to be replicated on the destination node. Each data pair includes a logical address and a representation (e.g., a hash value or other unique identifier) for a block of data to be replicated on the destination node. When the destination node receives the batch of data pairs, it determines for each data pair whether the data associated with the respective logical address is a duplicate of data that is already stored on the destination node.

In some embodiments, this determination is made by checking whether a hash value in the data pair matches a hash value of data that already exists on the destination node. If a block of data is determined to be a duplicate of data already stored in the destination node, the destination node points the logical address of the block of data to the physical address in the destination node where the block is stored. Alternatively, if a block of data is determined not to be a duplicate of data already stored in the destination node, the destination node marks the logical address of the block with an indication that the block needs to be resynchronized.

In part two of the deduplication process, according to some embodiments, after the destination node has identified which blocks of data need to be resynchronized, the source node obtains the data for each logical address that is marked for resynchronization from the corresponding physical address on the source node, and sends the data to the destination node to write (replicate) at a physical address on the destination node.

Notably, in the embodiment described above, part one includes sending the data pairs (e.g., logical address and hash value) to the destination node to mark data that needs to be resynchronized (non-duplicate data), while part two of the process includes the I/O processing for obtaining data from the source node and sending the data to the destination node for writing. Accordingly, the two-part process separates the tasks of identifying data for resynchronization and actually replicating the data.

An advantage of separating these operations is that it allows for an asynchronous process in which non-duplicate data can be marked but then written at a later time, as opposed to a synchronous process that requires the non-duplicate data to be written at the time that it is determined to be non-duplicative. Writing data to the destination node in part two is resource intensive compared to simply pointing a logical address to an existing physical address containing a copy of the data. Although the data pairs sent in part one may be small, they are sent for all blocks of data that may need to be resynchronized.

The two-part process also provides bandwidth flexibility, allowing the potentially resource-intensive batch delivery in part one to be separated, and performed independently, from the potentially resource-intensive tasks of obtaining, sending, and writing data in part two. Separating the duplication determination from the write operation also allows the data marked for resynchronization to be written in stages, as opposed to all at once. Since a delay in writing the non-duplicate data increases the risk of losing the data due to another failure (as described above), being able to write at least some of the non-duplicate data (even if there are insufficient resources to write it all at once) reduces the amount of data at risk of being lost.

Another advantage of the process described above is that it allows the data that needs to be resynchronized to be processed in batches. This provides the opportunity to dynamically optimize and tune the resynchronization process as it is being performed. The process can be optimized by monitoring system parameters (e.g., resource utilization) and batch heuristics (e.g., percentage of duplicates per data pair batch) and then adjusting aspects of the process (e.g., subsequent data pair batch size) based on feedback. For example, the process can be optimized to maximize the amount of data that gets flagged as a duplicate, which reduces resource consumption (e.g., computation time) by decreasing the amount of data that gets written to and stored on the destination node. These and other aspects of the present disclosure are described in further detail in the sections that follow.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

Figure 1:
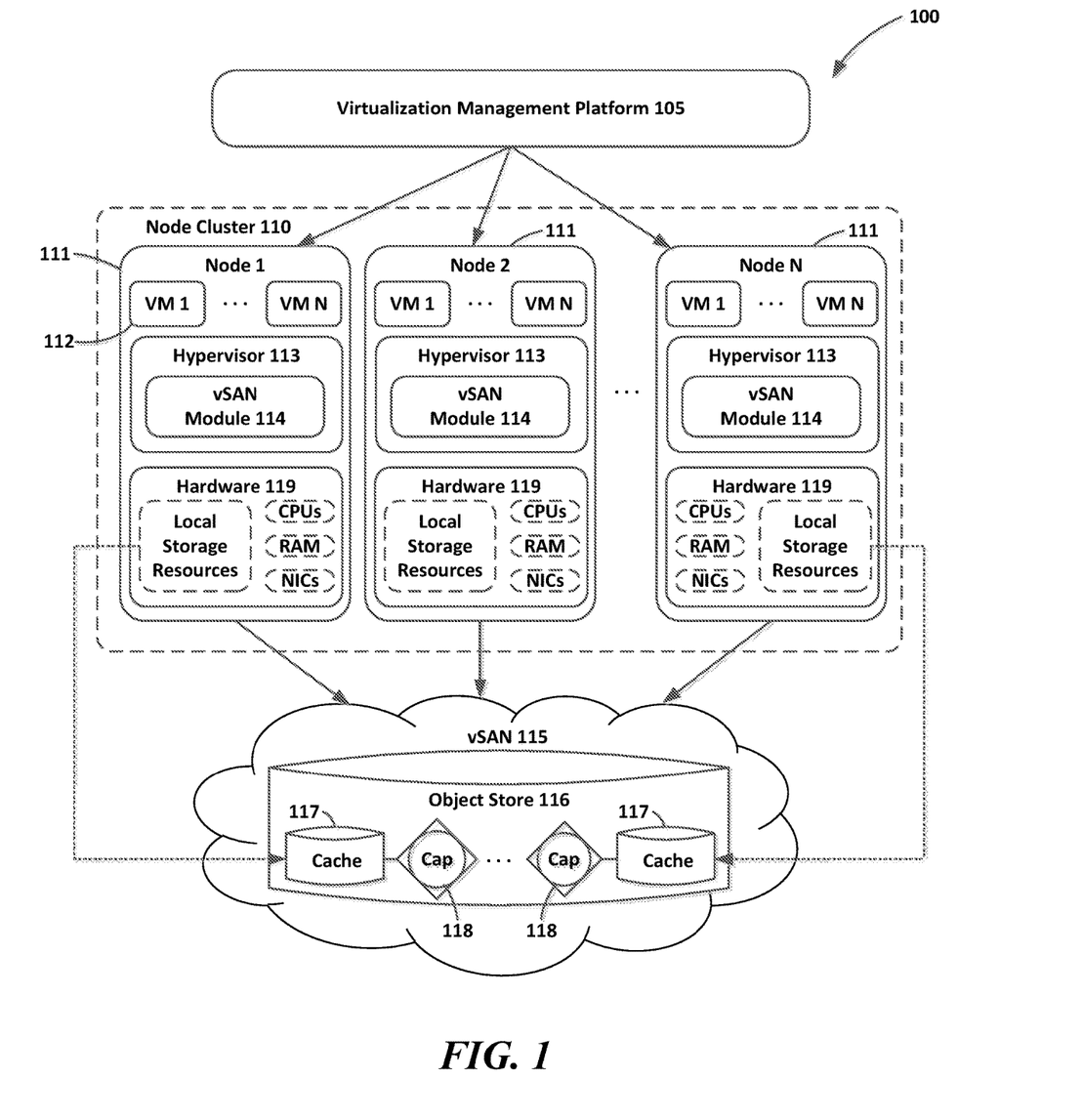
FIG. 1 illustrates a block diagram of an exemplary computing environment, according to some embodiments.

FIG. 1 illustrates a block diagram of a computing environment 100, according to some embodiments. As shown, computing environment 100 is a software-based "virtual storage area network" (vSAN) environment that leverages the commodity local storage housed in or directly attached (hereinafter, use of the term "housed" or "housed in" may be used to encompass both housed in or otherwise directly attached) to host servers or nodes 111 of a cluster 110 to provide an aggregate object store 116 to virtual machines (VMs) 112 running on the nodes. The local commodity storage housed in or otherwise directly attached to the nodes 111 may include combinations of cache tier drives 117 (e.g. solid state drives (SSDs) or NVMe drives) and/or capacity tier drives 118 (e.g., SSDs or magnetic/spinning disks).

In certain embodiments, cache tier drives 117 serve as a read cache and/or write buffer in front of capacity tier drives 118 to increase I/O performance. As further discussed below, each node 111 may include a storage management module (referred to herein as a "vSAN module") in order to automate storage management workflows (e.g., create objects in the object store, etc.) and provide access to objects in the object store (e.g., handle I/O operations to objects in the object store, etc.) based on predefined storage policies specified for objects in the object store. For example, because a VM may be initially configured by an administrator to have specific storage requirements for its "virtual disk" depending its intended use (e.g., capacity, availability, IOPS, etc.), the administrator may define a storage profile or policy for each VM specifying such availability, capacity, IOPS and the like. As further described below, the vSAN module may then create an "object" for the specified virtual disk by backing it with physical storage resources of the object store based on the defined policy.

A virtualization management platform 105 is associated with cluster 110 of nodes 111. Virtualization management platform 105 enables an administrator to manage the configuration and spawning of VMs on the various nodes 111. As depicted in the embodiment of FIG. 1, each node 111 includes a virtualization layer or hypervisor 113, a vSAN module 114, and hardware 119 (which includes the cache tier drives 117 and capacity tier drives 118 of a node 111). Through hypervisor 113, a node 111 is able to launch and run multiple VMs 112. Hypervisor 113, in part, manages hardware 119 to properly allocate computing resources (e.g., processing power, random access memory, etc.) for each VM 112. In some embodiments, vSAN module 114 is implemented as a "vSAN" device driver within hypervisor 113. Each hypervisor 113, through its corresponding vSAN module 114, provides access to a conceptual "vSAN" 115, which includes storage resources located in hardware 119 (e.g., cache tier drives 117 and capacity tier drives 118) for use as storage for virtual disks (or portions thereof) and other related files that may be accessed by any VM 112 residing in any of nodes 111 in cluster 110. In a particular embodiment, vSphere® Hypervisor from VMware, Inc. (VMware) may be installed on nodes 111 as hypervisor 113 and vCenter® Server from VMware may be used as virtualization management platform 105.

A virtual/logical object may itself be a hierarchical or "composite" object that is further composed of "component" objects (again separately backed by object store 116) that reflect the storage requirements (e.g., capacity, availability, IOPS, etc.) of a corresponding storage profile or policy generated by the administrator when initially creating the virtual disk. Each vSAN module 114 (through a cluster level object management or "CLOM" sub-module) communicates with other vSAN modules 114 of other nodes 111 to create and maintain an in-memory metadata database (e.g., maintained separately but in synchronized fashion in the memory of each node 111) that contains metadata describing the locations, configurations, policies and relationships among the various objects stored in object store 116.

Figure 2:
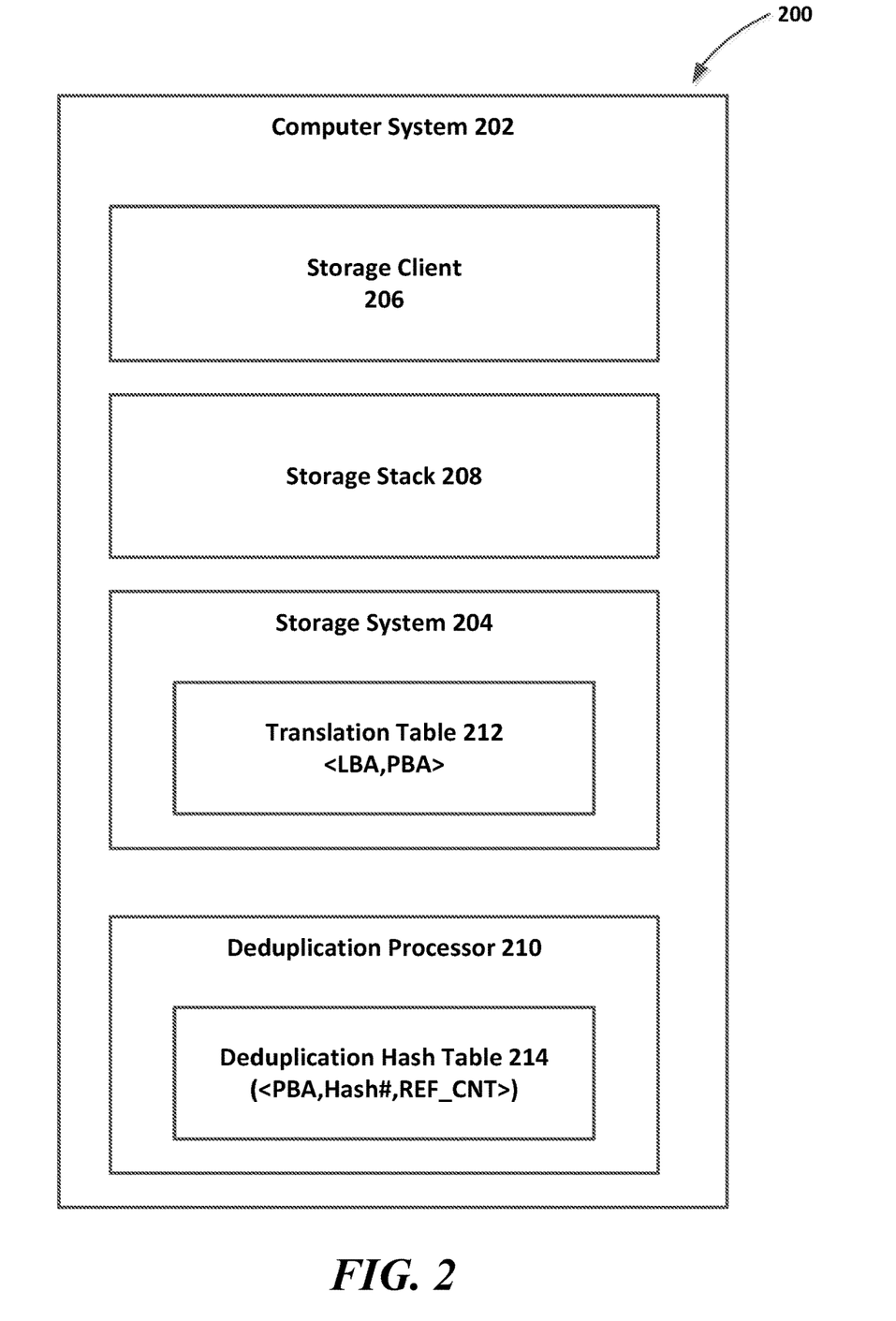
FIG. 2 illustrates a block diagram of an exemplary computing environment, according to some embodiments.

FIG. 2 is a simplified block diagram of an exemplary system environment 200 in which embodiments of the resynchronization and deduplication techniques described herein may be implemented. As shown, system environment 200 includes a computer system 202 that is communicatively coupled with a storage system 204. Computer system 202 comprises one or more storage clients (e.g., operating systems, hypervisors, applications, virtual machines (VMs), etc.) 206 and a storage stack 208. Storage stack 208 provides an I/O data path that enables storage client(s) 206 to read data from, and write data to, logical storage objects (e.g., files) that are persisted on the physical storage device(s) of storage system 204.

Storage stack 208 typically includes a file system layer that translates client I/O requests directed to files into I/O commands that specify logical block addresses (LBAs). These I/O commands are communicated via a block-level interface (e.g., NVMe on PCIe, SCSI, ATA, etc.) to a controller of storage system 204, which translates the LBAs into physical block addresses (PBAs) corresponding to the physical locations where the requested data is stored and executes the I/O commands against the physical block addresses.

In the embodiment of FIG. 2, system environment 200 implements deduplication of data that is written to storage system 204. System environment 200 includes a deduplication processor 210 that is communicatively coupled with storage system 204 and that interacts with a translation table 212 (maintained on storage system 204) and a deduplication hash table 214 (maintained on deduplication processor 210). Translation table 212 can hold, for each data block written to storage system 204, a mapping between (1) the LBA for the data block and (2) a PBA in a particular physical storage device of storage system 104 where the data block is actually stored. Deduplication hash table 214 can hold, for each physical data block stored in storage system 204, an entry that identifies (1) the PBA of the data block, (2) a fingerprint (e.g., hash) of the content of the data block, and (3) and a reference count of the number of LBAs that point to this PBA in translation table 212.

If a hash of a data block B matches a hash value in the deduplication hash table 214, deduplication processor 210 can conclude that an exact copy of B (i.e., B') already exists on disk and thus can (1) modify the LBA-to-PBA mapping for B in translation table 212 to point to the physical address of existing copy B', and (2) increment the reference count for the entry of B' in deduplication hash table 214. On the other hand, if the hash of data block B does not match a hash value in the deduplication hash table 214, deduplication processor 210 can conclude that B is unique (i.e., the data content is not stored on disk). As a result, deduplication processor 210 flags the logical address as not having a copy on computer system 202 (e.g., as needing resynchronization).

FIGS. 1 and 2 are illustrative and not intended to limit embodiments of the present disclosure. For example, although deduplication processor 210 is shown as a stand-alone component, in certain embodiments deduplication processor 210 may be integrated into storage system 204 or computer system 202. Further, the various entities shown in these figures may include sub-components or implement functions that are not specifically described. One of ordinary skill in the art will recognize many variations, modifications, and alternatives.

Figure 3A:
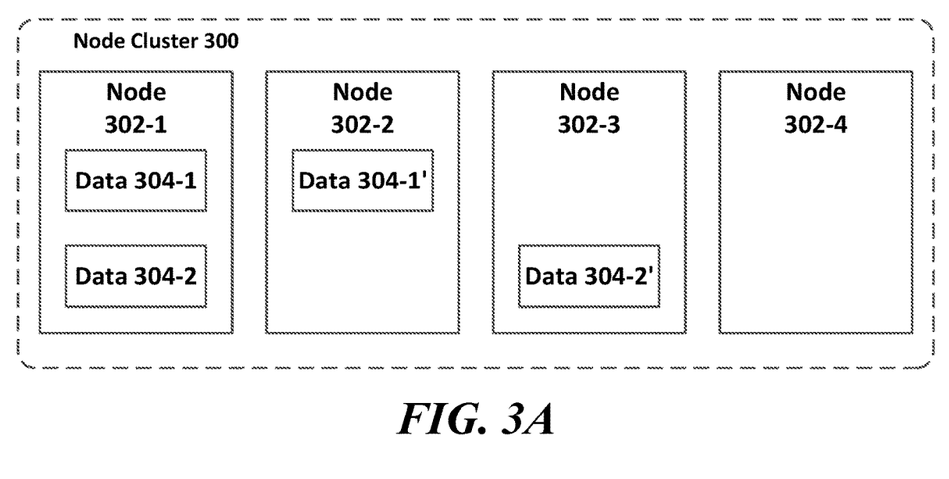
FIGS. 3A-3B illustrate an exemplary node cluster, according to some embodiments
Figure 3B:
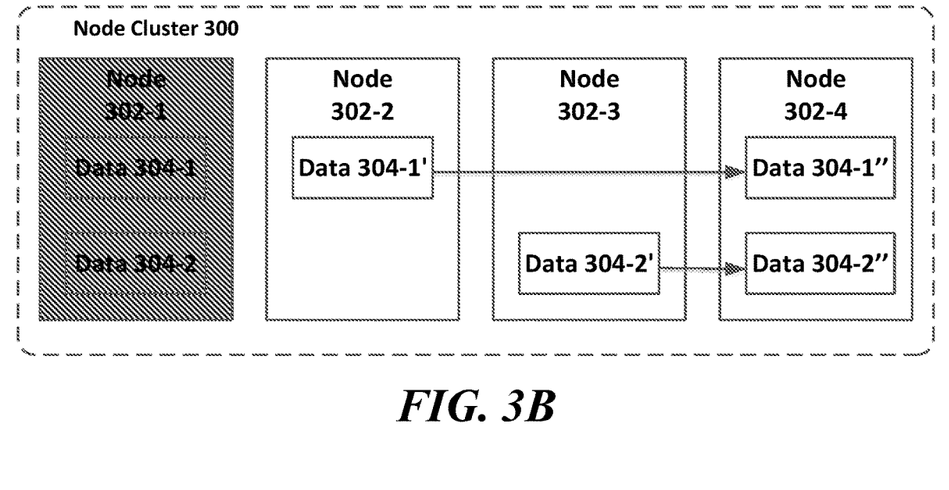

FIGS. 3A-3B illustrate an embodiment of a node cluster 300 that includes nodes 302-1 thru 302-4. In some embodiments, each of Nodes 302-1 thru 302-4 includes node 111 in FIG. 1, computer system 202, or a portion thereof. FIG. 3A illustrates a configuration of node cluster 300 at a first time, at which Node 302-1 includes Data 304-1 and Data 304-2, Node 302-2 includes a copy Data 304-1' of Data 304-1 (e.g., in accordance with a failure to tolerate policy of 1), Node 302-3 includes a copy Data 304-2' of Data 304-2 (e.g., again, in accordance with a failure to tolerate policy of 1), and Node 302-4 does not include a copy of Data 304-1 or Data 304-2. In some embodiments, Node 302-4 is active at the first time and stores other data, but not copies of Data 304-1 or Data 304-2. In some embodiments, Node 302-4 is idle or powered off at the first time.

At a later second time depicted by FIG. 3B, Node 302-1 fails, thus making Data 304-1 and Data 304-2 unavailable. As indicated in FIG. 3B, in response to the failure of Node 302-1, the node cluster 300 initiates a resynchronization process to rebuild another copy of Data 304-1 and Data 304-2 on Node 302-4 in order to compensate for loss of Data 304-1 and Data 304-2 due to the failure of Node 302-1 (e.g., in order to re-establish a failure to tolerate of 1 for Data 304-1 and Data 304-2). In some embodiments, Node 302-4 is initialized or brought online to replace Node 302-1. In some embodiments, Node 302-4 is already online and is determined to have sufficient storage resources for copies of Data 304-1 and Data 304-2.

Figure 4A:
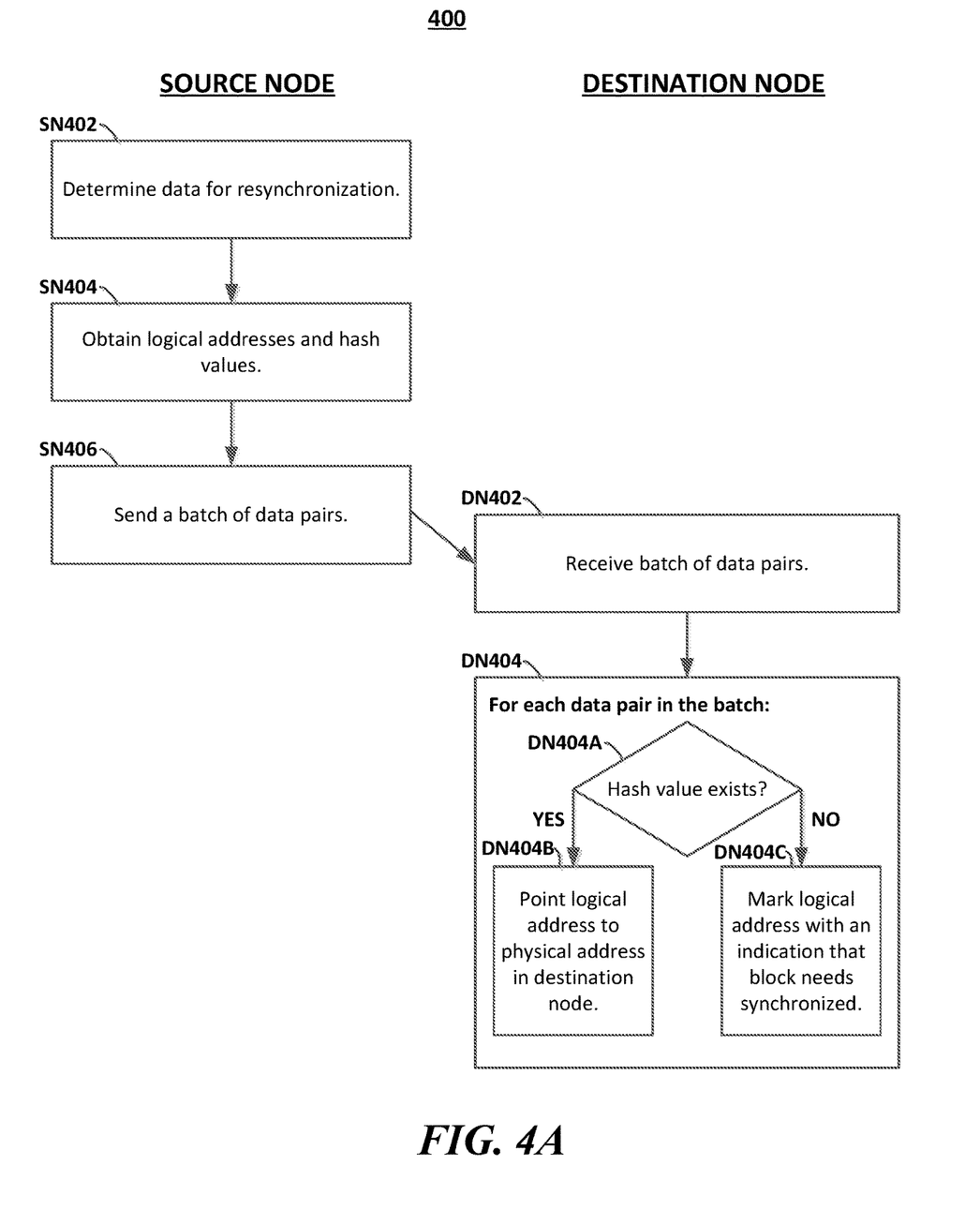
FIGS. 4A-4B depict a flow diagram of an exemplary process, according to some embodiments.
Figure 4B:
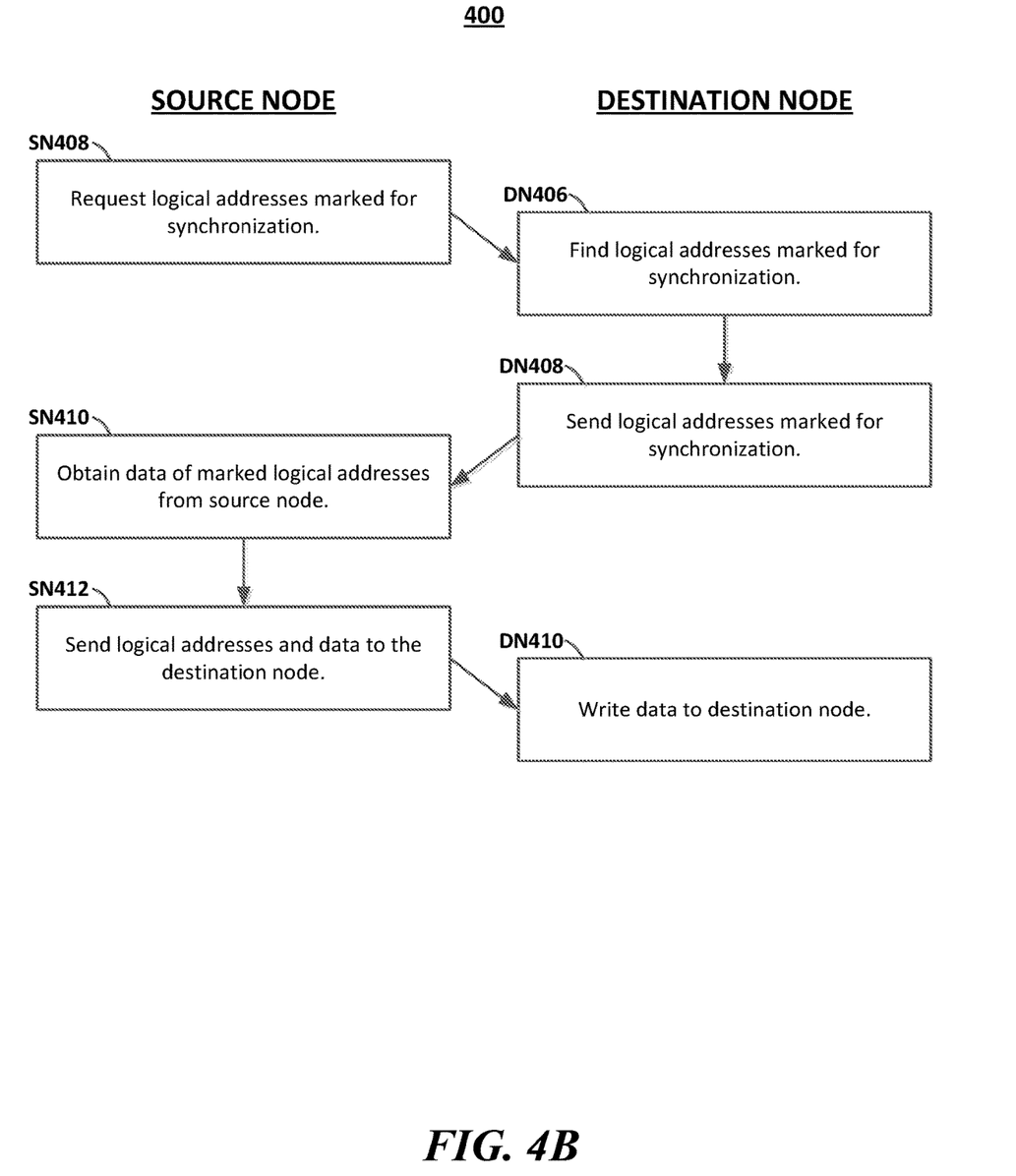

FIGS. 4A-4B depict a flow diagram of an exemplary data resynchronizing process 400 for writing data (e.g., Data 304-1') from a source node (e.g., Node 302-2) to a destination node (e.g., Node 302-4). Process 400 is performed at a computing environment (e.g., 100, 200, or 300) including a source node (e.g., 111 or 302) and a destination node (e.g., 111 or 302).

Process 400 includes an exemplary embodiment of a technique for deduplication of the resynchronized data (e.g., reducing the storage of redundant data during resynchronization). In particular, according to the techniques described herein, a system only copies data once into the destination node during the resynchronization process. This has the advantages of reducing the data traffic during resynchronization and increasing resynchronization performance (e.g., greater speed, fewer errors, and less memory consumption). However, other data deduplication techniques may be applied to complement or further improve the techniques described herein. Some operations in process 400 are, optionally, combined, the order of some operations are, optionally, changed, and some operations are, optionally, omitted. Additional operations are optionally added.

At block SN402, the source node determines which data is to be resynchronized and which portion of the data is to be resynchronized on the destination node. Optionally, the source node assigns different portions of the data to be resynchronized to different destination nodes, e.g., based on the storage utilization of available nodes. For example, the source node may determine, e.g., based on the amount of data that is to be resynchronized and the available memory on potential destination nodes, that all of the data is unlikely to fit on a single destination node. The source node may therefore distribute the data among two or more destination nodes.

In some embodiments, a node or system component other than the source node determines what data is to be resynchronized and assigns a destination node for each portion of the data. For example, a "master" node in a node cluster (e.g., 110 or 300) that coordinates storage for a vSAN (e.g., 115) may identify what data was lost as a result of a failure and determine which destination node(s) are assigned to which portion(s) of the data to be resynchronized. In some embodiments, the data to be resynchronized and which node(s) contain a copy of the data is determined based on a mapping of the logical addresses that were assigned to the physical addresses of a failed node (e.g., Node 302-1), such as in translation table 212 in FIG. 2. Furthermore, in a system with a failure to tolerate of more than one, there will be two or more copies of data affected by a failure located on two or more respective nodes. Thus, as system may also determine which node(s) will serve as the source node(s) for a particular portion of data.

Figure 5A:
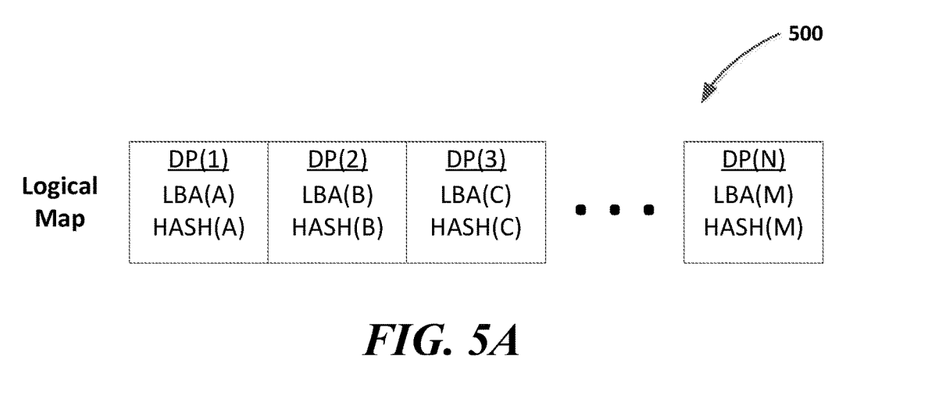
FIGS. 5A-5B illustrate exemplary representations of logical maps, according to some embodiments.

At block SN404, the source node obtains the logical address and a hash value (e.g., from deduplication hash table 214) for each block of data to be resynchronized. The logical addresses (LBAs) and hash values are organized into a logical map that includes a data pair for each block of data to be resynchronized. Each data pair includes the logical address and the hash value for the corresponding block of data. FIG. 5A illustrates an exemplary representation of a logical map 500 that includes a plurality of data pairs DP(1)-DP(N). Optionally, the logical map is stored in the source node using one or more high speed, low-latency storage devices (e.g., NVMe-based flash or NVDIMM) to accelerate access to this data. Also, despite the use of the term "data pair," a "data pair" optionally includes additional information associated with the logical address and/or hash value (e.g., metadata, a physical address, etc.).

Figure 5B:
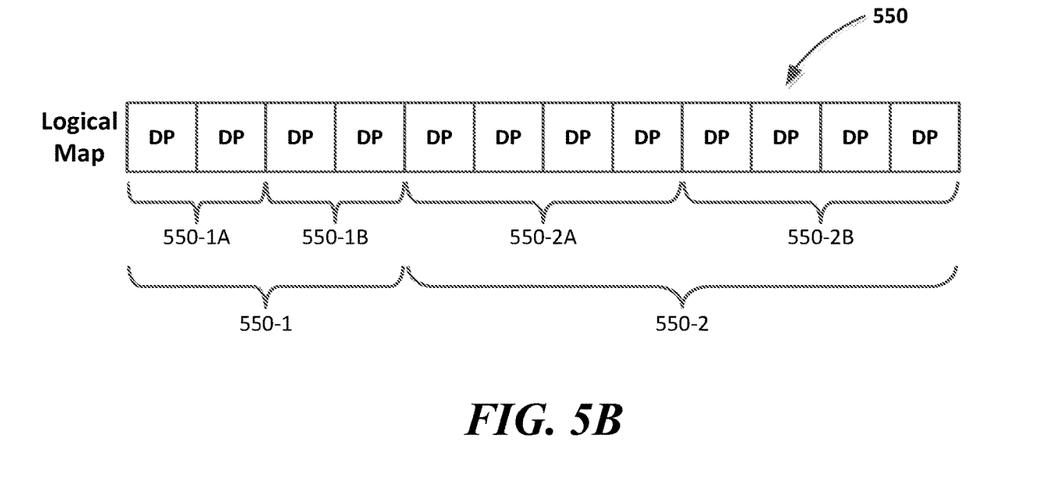

At block SN406, the source node sends a batch of data pairs to the destination node. The batch includes at least a portion of the logical map. In some embodiments, the batch includes the entire logical map. In some embodiments, the logical map is divided into multiple batches. FIG. 5B illustrates an exemplary logical map 550 that is divided into two batches 550-1 and 550-2. Optionally, the batch of data pairs is divided into sub-batches and sent to the destination node in sub-batches. For example, the batches 550-1 and 550-2 in exemplary logical map 550 are divided into sub-batches 550-1A, 550-1B, 550-2A, and 550-2B, as illustrated in FIG. 5B. Since processing a batch consumes both processing and memory resources, dividing the batch into sub-batches can spread out the use of resources required to send the batch, as opposed to potentially bogging down the system by sending the entire batch all at once. Although FIG. 5B shows an exemplary division of logical map 550, the size of the batches and the data pairs included within the batches are not necessarily predetermined and can be selected and/or adjusted over time.

It is advantageous, in some embodiments, to divide the logical map into several batches. One advantage to processing the logical map in batches is that it allows process 400 to be optimized in order to reduce the overall amount of resources required to resynchronize the data. For example, the batch size can be adjusted over time to increase the likelihood of deduplication, which reduces the amount of duplicate data written to the destination device. In some embodiments, the source node selects a batch (e.g., the size of the batch and/or the specific data pairs to include in the batch) based on some criteria. For example, the data pairs are optionally grouped by component (e.g., a portion of a VM), such that each batch corresponds to a different component. In some embodiments, the batch size is selected and adjusted based on memory utilization of the destination node and/or the percentage of logical addresses in a previous batch that were marked for resynchronization. Exemplary techniques for selecting a batch and advantages of dividing the logical map into batches are described in greater detail below with respect to FIG. 6.

Returning to FIG. 4A, at block DN402, the destination node receives the batch of data pairs. Optionally, the destination node stores the batch of data pairs. In some embodiments, the destination node stores the data pairs and decides when to perform further processing (e.g., block DN404) depending on resource demands. For example, if the destination node is being heavily utilized or has higher priority tasks to perform, the destination node can delay the processing described below with reference to block DN404 until more resources are available. In some embodiments, the data pairs are stored using one or more high speed, low-latency storage devices (e.g., NVMe-based storage or NVDIMM) to accelerate access to this data.

At block DN404, for each data pair in the received batch, the destination node determines whether the hash value matches an existing hash value of data that is already stored on the destination node (DN404A). In this way, the destination node determines whether the data associated with the corresponding logical address is a duplicate of data already stored in the destination node. If a block of data is determined to be a duplicate, the destination node points the corresponding logical address to the physical address in the destination node where the block is stored (DN404B). Optionally, the destination node also increases a reference count of the number of logical addresses that point to the physical address of the destination node (e.g., in deduplication hash table 214). Alternatively, if a block of data is determined not to be a duplicate, the destination node marks the logical address of the block with an indication that the block needs to be synchronized (DN404C). For example, the destination node may point the logical address to an invalid physical address (e.g., −1). In some embodiments, the destination node includes, or is associated with, a deduplication processor (e.g., 210) and forwards each data pair to the deduplication processor to perform the operations in block DN404.

Deduplication can be assessed on, e.g., a per node basis, where a node includes a collection of disks, or on a per disk basis (e.g., data can be duplicated on different disks within a node, but not on the same disk), depending to the deduplication policy.

Turning to FIG. 4B, process 400 continues to block SN408. At block SN408, the source node requests the logical addresses in the batch that are flagged for synchronization. In some embodiments, the source node does not request the logical addresses flagged for synchronization immediately after sending the batch of data pairs (block SN406) or immediately upon completion of the operations in block DN404. In some embodiments, the source node requests the flagged logical addresses based on the resource demands on the source node and/or the destination node. That is, the source node may delay requesting the logical addresses flagged for synchronization based on, e.g., system resource utilization.

As described above, in some embodiments, the request of block SN408 initiates part two of the two-part resynchronization/deduplication process, whereas blocks SN402-SN406 and DN402-DN404 are included in part one. However, that the division between part one and part two can vary. For example, checking whether the blocks of data are duplicates, as described with respect to block DN404, can be included in step two instead of step one.

At block DN406, the destination node (e.g., in response to receiving the request from the source node in block SN408) searches the batch to find the logical addresses that are marked for synchronization. In block DN408, the destination node sends the logical addresses marked for resynchronization to the source node. In block, SN410, the source node (e.g., in response to receiving the marked logical addresses from the destination node) obtains the data associated with the logical addresses from corresponding physical addresses on the source node. In block SN412, for each marked logical address, the source node sends the logical address and the corresponding data to the destination node to write. In block DN410, for each marked logical address, the destination node writes the corresponding data received from the source node to a physical address on the destination node. The destination node also updates the logical addresses to point to the corresponding physical addresses on the destination node.

Other variations are possible with respect to how and when the source node obtains the flagged logical addresses and when the source node initiates a write request of the corresponding data. For example, in some embodiments, the destination node sends flagged logical addresses to the source node as they are identified or upon completion of processing a batch, without a request from the source node. In some such embodiments, the source node immediately initiates a write request for the corresponding data upon receiving the flagged logical address, or it may store the flagged logical addresses and initiate write requests at a later time depending on resource utilization.

In some embodiments, after the data marked for synchronization is written to the destination node, if a portion of the logical map remains to be processed, the operations described above are repeated for another unprocessed batch of the logical map. Accordingly, the process described above can be repeated until the entire logical map is processed. For example, after completing block DN410, process 400 returns to block SN406 to send another batch of data pairs in the logical map.

Consistent with the embodiment described above in the Summary section, process 400 describes a two-part process in which sending the data pairs (e.g., logical address and hash value) to the destination node to mark data that needs to be resynchronized (non-duplicate data) is separated from the I/O processing for obtaining data from memory of the source node, sending the data to the destination node, and writing the data to the destination node. An advantage of separating these tasks is that it allows for an asynchronous process in which non-duplicate data can be marked but then written at a later time, as opposed to a synchronous process that requires the non-duplicate data to be written at the time that it is determined to be non-duplicative.

This is advantageous because obtaining, sending, and writing the data associated with an individual block of data typically requires more resources than sending a data pair (e.g., logical address and hash value) for the individual block of data. The data pairs do not require a lot of memory to store and may be stored in cache or other quickly accessible memory (e.g., SSD), as compared to the raw data associated with the data pair, which requires a greater amount of memory and may be stored in a slower memory location (e.g., disk). However, the data pairs are sent for every block that needs to be resynchronizes, whereas raw data is only obtained, sent, and written for data blocks that are not duplicates. Accordingly, if the percentage of duplicates in a particular batch is low, part two is likely to require significantly more resources than part one.

Thus, the two-part process provides bandwidth flexibility, allowing the batch delivery in part one to be separated, and performed independently, from the tasks of obtaining, sending, and writing data in part two, which are more resource-intensive on a per block basis. This allows the system to decide when to write the data to the destination node and accommodate competing demands from resources. For example, if multiple nodes are affected by a failure, each affected node may independently begins trying to resynchronize data with the same destination node. Depending on current resource consumption and demands (e.g., from other nodes also attempting to resynchronize data), a system may decide to delay step two after step one is complete (e.g., to a time when resource demand from other operations is low). In some embodiments, a system may schedule the operations in step two based on the number of blocks marked for synchronization and/or an estimate of the resources required to synchronize the marked blocks.

And as mentioned above, separating the duplication determination from the write operation also allows the data marked for resynchronization to be written in stages (e.g., batches or sub-batches), as opposed to all at once. Since a delay in writing the non-duplicate data increases the risk of losing the data due to another failure, being able to write at least some of the non-duplicate data (even if there are insufficient resources to write it all at once) reduces the amount of data at risk of being lost. Furthermore, allowing the data that needs to be resynchronized to be processed in batches provides the opportunity to dynamically optimize and tune the resynchronization process as it is being performed. The process can be optimized by monitoring system parameters (e.g., resource utilization) and batch heuristics (e.g., percentage of duplicates per data pair batch) and then adjusting aspects of the process (e.g., subsequent data pair batch size) based on feedback. For example, the process can be optimized to maximize the amount of data that gets flagged as a duplicate, which reduces resource consumption by decreasing the amount of data that gets written to and stored on the destination node. Techniques for optimizing the processes described above will now be described in greater detail below with respect to FIG. 6.

Figure 6:
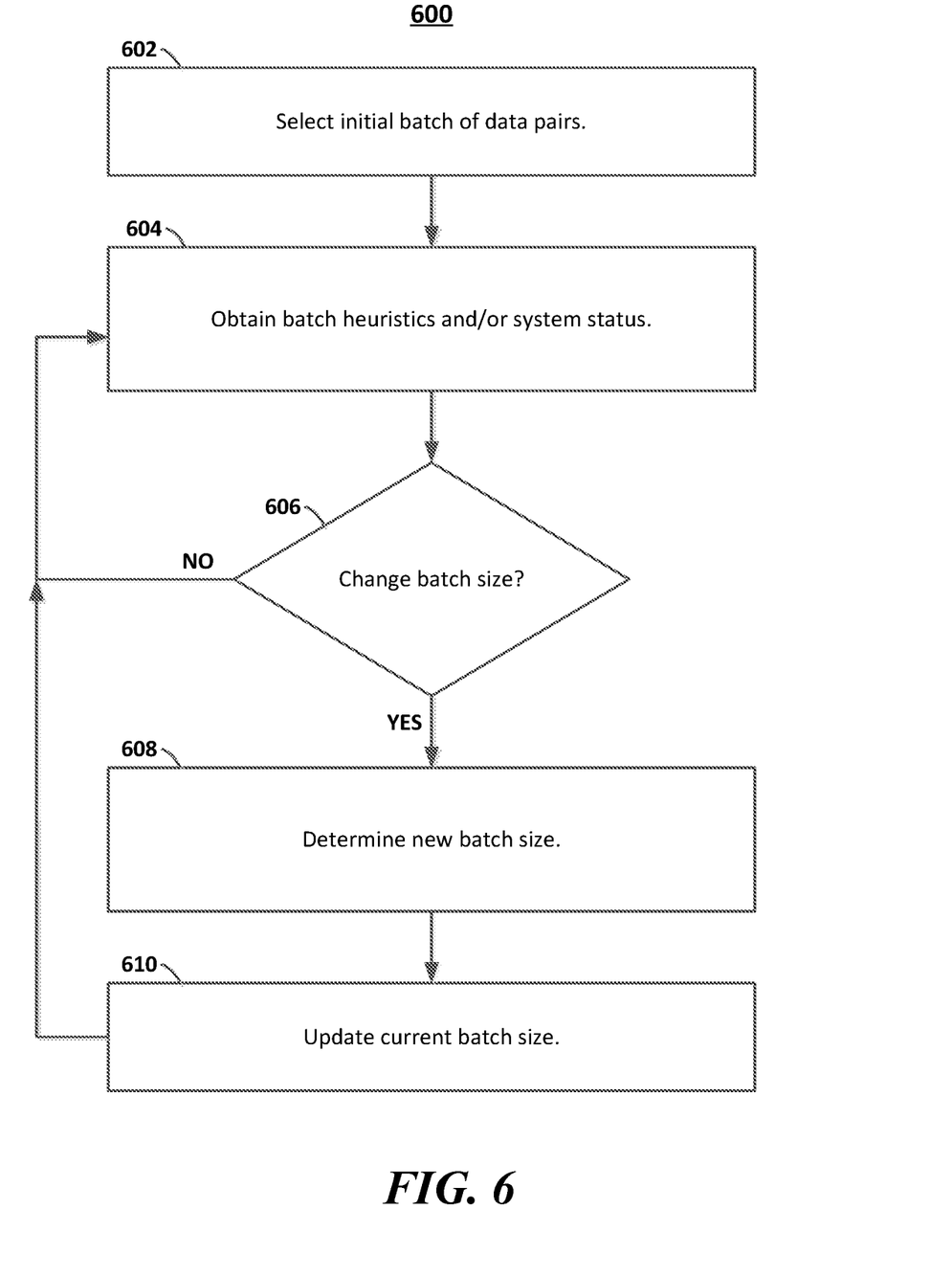
FIG. 6 depicts a flow diagram of an exemplary process, according to some embodiments.

As mentioned above, in some embodiments, the source node selects a batch (e.g., the size of the batch and/or the specific data pairs to include in the batch) based on some criteria. FIG. 6 depicts exemplary process 600 for selecting a batch of data pairs, in accordance with some embodiments. Process 600 is performed at a source node (e.g., 111 or 302) and is configured to dynamically tune the batch size, e.g., in process 400, in order to reduce the number of duplicates unnecessarily written to storage and maximize the batch size to attain batch-processing efficiencies. Process 600 is optionally performed in parallel with process 400 or, for example, after block DN410 prior to returning to block SN406. In some embodiments, some operations of process 600 are performed at components of a computing environment (e.g., 100, 200, or 300) other than the source node. Furthermore, some operations in process 600 are, optionally, combined, the order of some operations are, optionally, changed, and some operations are, optionally, omitted. Additional operations are optionally added.

At block 602, a source node (e.g., Node 302-2) selects an initial batch (e.g., 550-1A) of data pairs in a logical map (e.g., 550). In some embodiments, the initial batch is selected based on a characteristic of the data being resynchronized (e.g., the virtual object with which the data is associated). In some embodiments, the initial batch size is a system default or a user-selected size. In some embodiments, the initial batch size is based on inherent characteristics of the system (e.g., storage capacity, processing speed, etc.). In some embodiments, the source node selects an initial batch size based on batch heuristics or system status.

Various factors affect the effectiveness (e.g., number of unnecessarily written duplicates) and efficiency (e.g., resources consumed) by process 400 described above and can be considered when selecting a batch of data pairs, including the initial batch.

For example, the object or component of the virtualized computing system associated with the data represented by the data pairs can affect the resources consumed by process 400. Accordingly, in some embodiments, a batch is chosen based on the object or component with which the data pairs are associated. An object (e.g., a VM) can include multiple components. If multiple objects and/or components are affected by the node failure, then the logical map can therefore include data pairs associated with multiple objects and/or components. However, it is less likely to have duplicate blocks of data within a component than across multiple components. For example, since different VMs often use the same applications (e.g., operating system), data from different objects (e.g., different VMs) are more likely to include duplicates than data from the same object. Similarly, data from different components are more likely to include duplicates than data from a single component. Accordingly, selecting a batch of data pairs from a common component or object can reduce the chance of having duplicates in the same batch, which will be unnecessarily written multiple times, as described above. Then, future batches will be more likely be duplicates of data that already resides on the destination node since the future batches are associated with different components or objects than previous batches.

In addition, according to exemplary process 400, data blocks within a batch are all checked for deduplication (e.g., block DN404) prior to any of the data in the batch being written. Accordingly, unless a batch is otherwise screened for internal duplication, duplicates within the same batch may not be identified as such in block DN404, unless a duplicate already happens to be stored at the destination node. Thus, duplicates within a batch may be unnecessarily written to the destination node multiple times. This is one advantage of a smaller batch size—a smaller batch is less likely to contain duplicates within the batch itself. On the other hand, larger batch sizes are more computationally efficient. Processing each batch includes overhead associated with the source node accessing and sending the data pairs (logical addresses and hash values) and with the destination node receiving and, optionally, storing the data pairs. Larger batch sizes reduce the overall number of batches, and thus reduce the overhead required to process the entire batch.

Various techniques for selecting a batch can be used to balance these competing factors and reduce the overall resources required to perform the resynchronization process.

For example, batch heuristics and/or system status can be used to determine a batch size. Exemplary system status includes resource (e.g., processor and/or storage) utilization of the source node or the destination node. The resource utilization can be past utilization or estimated future utilization (e.g., based on unprocessed scheduled tasks). Examples of batch heuristics include deduplication statistics (e.g., the number of duplicates and/or non-duplicates, the average number of duplicates and/or non-duplicates, the change in the number or average number of duplicates and/or non-duplicates, the ratio of duplicates to non-duplicates, the change in the ratio of duplicates to non-duplicates). These statistics can be further categorized (e.g., number of duplicates per component, etc.) The exemplary statistics listed above are merely exemplary and can represent values associated with a single batch, multiple batches (e.g., a predetermined number of batches), a non-integer number of batches, a number of data pairs, or a range of time (e.g., previous 5 minutes). Optionally, the values can be determined on a running basis (e.g., overall average, moving average, running tally, etc.). Batch heuristics and/or system status can be monitored by the source node, destination node, or another portion of the system.

At block 604, the source node obtains updated batch heuristics and/or system status. In some embodiments, the source node obtains batch heuristic or system status by sampling a system parameter (e.g., its own resource utilization) or by requesting batch heuristics from another source (e.g., the destination node). In some embodiments, the source node obtains batch heuristics on a periodic basis. In some embodiments, the source node obtains batch heuristics at predetermined time intervals (e.g., every 10 seconds) or predetermined processing intervals (e.g., after processing a predetermined number of batches or a predetermined number of data pairs since the last determination). In some embodiments, the source node obtains updated batch heuristics based on when they are provided by another source, which may send batch heuristics to the source node, e.g., at predetermined time intervals or predetermined processing intervals. In some embodiments, the source node obtains updated batch heuristics in response to a determination (e.g., by the source node or another source) that a threshold has been met (e.g., a time threshold or a statistical threshold of a batch heuristic).

At block 606, the source node determines whether the current batch size should be changed. In some embodiments, the source node determines whether to change the current batch size whenever it obtains updated batch heuristics or on a periodic basis. In some embodiments, the source node determines whether the current batch size should be changed in response to a determination, or receiving an indication, that a threshold has been met (e.g., the ratio of duplicates to non-duplicates exceeds a predetermined threshold).

In some embodiments, the source node determines whether the current batch size should be changed based on the current batch size (e.g., if the current batch size is already at a predetermined maximum size, the batch size will not be increased regardless of the batch heuristics). In some embodiment, the source node determines whether the current batch size should be changed based on batch heuristics or system status. For example, the less data that is stored on a destination device, the less likely it is that a block of data will be a duplicate. In other words, data is less likely to be flagged as a duplicate when a destination node is not storing much data (e.g., such as shortly after a new node is initiated to replace a failed node), compared to when the destination node is storing a greater amount of data. Thus, each block is more likely to need to be written when memory utilization of the destination node is low compared to when memory utilization is high. Accordingly, it is desirable to minimize the number of blocks that are sent (reduce the batch size) when memory utilization is low, and maximize the number of blocks that are sent (increase the batch size) when memory utilization is high, in order to increase the average probability that a block will be a duplicate and thus not need to be written. In some embodiments, the source node determines that the current batch size should be changes in accordance with a determination that memory utilization of the destination node is greater or less than a threshold utilization. The threshold is optionally based on the current batch size.

If the source node determines that the current batch size should not be changed, process 600 returns to block 604 to obtain updated batch heuristics or system status. If the source node determines that the current batch size should be changed, process 600 moves to block 608, where the source node determines a new batch size. In some embodiments, the batch size is changed by a predetermined amount (e.g., a predetermined percentage of the current batch size or a predetermined number of data pairs). In some embodiments, the batch size is changed by an amount that is determined based on batch heuristics or system status. The number of data pairs in the selected plurality of data pairs is, optionally, selected to be directly proportional to the memory utilization of the destination node, or optionally, selected to be directly proportional to the number of blocks of data previously determined to be a duplicate of data stored on the destination node. For example, the source node can change the batch size by an amount proportional to change in the percentage of duplicates per batch over a predetermined number of most recently processed batches.

At block 610, the source node updates the current batch size to the newly determined batch size. From block 610, process 600 returns to block 604.

Figure 7:
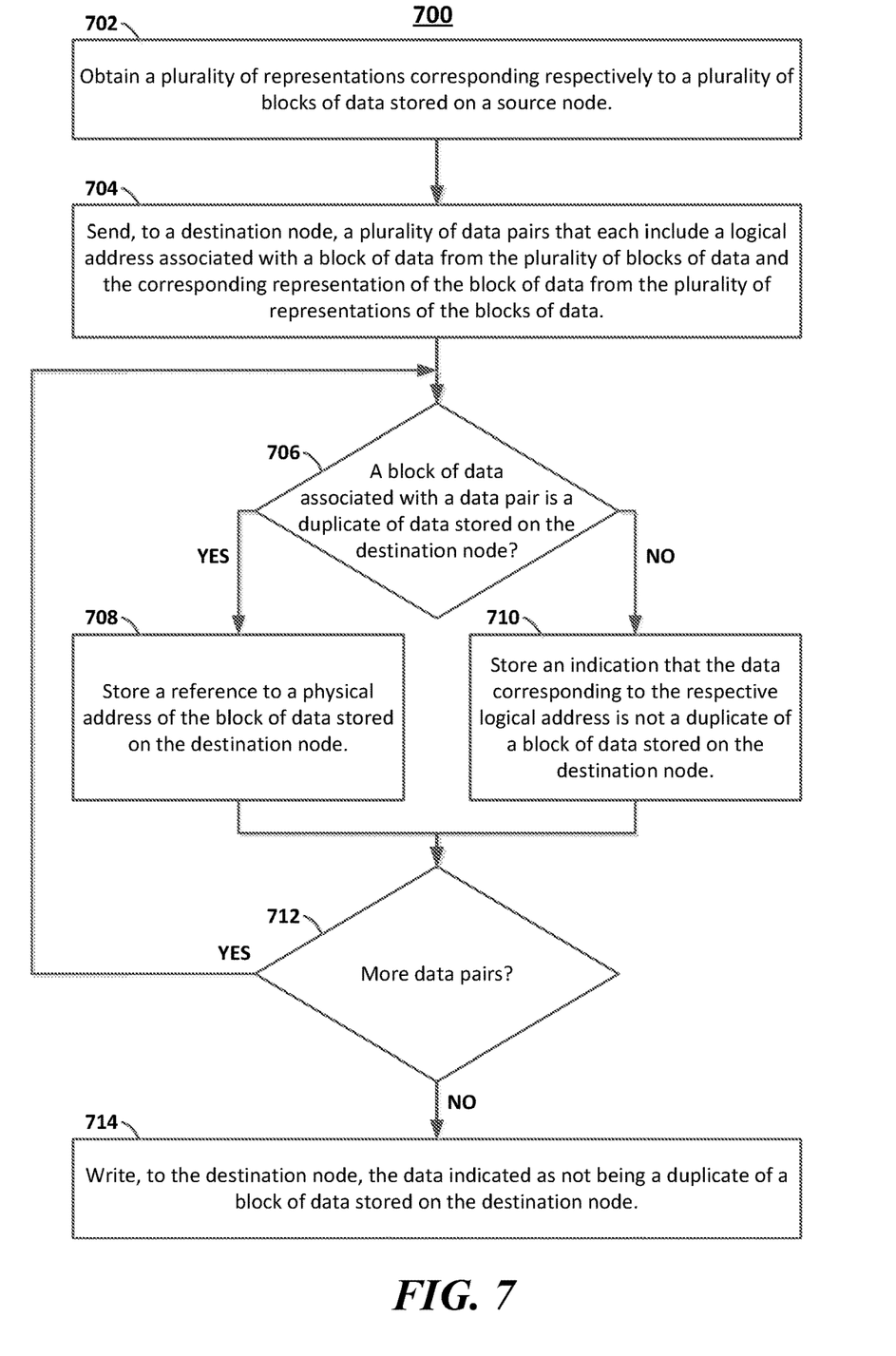
FIG. 7 depicts a flow diagram of an exemplary process, according to some embodiments.

Turning now to FIG. 7, an exemplary process 700 for resynchronizing data in a distributed storage system using content-based data deduplication in accordance with some embodiments is depicted. Process 700 is performed at a computing environment (e.g., 100, 200, or 300) including a source node (e.g., 111 or 302) and a destination node (e.g., 111 or 302). Some operations in process 700 are, optionally, combined, the order of some operations are, optionally, changed, and some operations are, optionally, omitted. Additional operations are optionally added.

At block 702, the source node obtains a plurality of representations corresponding respectively to a plurality of blocks of data stored on the source node. In some embodiments, the plurality of representations corresponding respectively to the plurality of blocks of data stored on the source node include hashes of the respective blocks of data. In some embodiments, the plurality of blocks of data stored on the source node are selected based on a determination that the plurality of blocks of data stored on the source node are copies of data previously stored on a failed node.

At block 704, the source node sends a plurality of data pairs to the destination node, wherein each data pair in the plurality of data pairs includes a logical address associated with a block of data from the plurality of blocks of data and the corresponding representation of the block of data from the plurality of representations of the blocks of data.

In some embodiments, the plurality of blocks of data stored on the source node are associated with respective components of a virtualized computing system. In such embodiments, before sending the plurality of data pairs to the destination node, the system optionally selects the plurality of data pairs based on the component with which the blocks of data stored on the source node are associated.

In some embodiments, before sending the plurality of data pairs to the destination node, the system selects the plurality of data pairs based on memory utilization of the destination node or a number of blocks of data previously determined to be a duplicate of data stored on the destination node. The number of data pairs in the selected plurality of data pairs is, optionally, selected to be directly proportional to the memory utilization of the destination node, or optionally, selected to be directly proportional to the number of blocks of data previously determined to be a duplicate of data stored on the destination node.

At block 706, the destination node determines whether a block of data associated with a respective logical address is a duplicate of data stored on the destination node based on the representation of the block of data associated with the respective logical address. In embodiments in which the representation of the block of data includes a hash of the block of data, the determination in block 706 is optionally based on whether the hash of the block of data associated with the respective logical address matches a hash of data stored on the destination node.

At block 708, in accordance with a determination that the block of data associated with the respective logical address is a duplicate of a block of data stored on the destination node, the destination node stores a reference to a physical address of the block of data stored on the destination node.

At block 710, in accordance with a determination that the block of data associated with the respective logical address is not a duplicate of a block of data stored on the destination node, the destination node stores an indication that the data corresponding to the respective logical address is not a duplicate of a block of data stored on the destination node.

At block 712, the destination node determines whether there are more data pairs to check for duplicates. If yes, process 700 returns to block 706. If not, process 700 moves to block 714.

At block 714, the data indicated as not being a duplicate of a block of data stored on the destination node is written to the destination node. In some embodiments, before writing the data indicated as not being a duplicate of a block of data stored on the destination node, the computing environment determines whether predetermined criteria are met, where the data indicated as not being a duplicate of a block of data stored on the destination node is written in accordance with a determination that the predetermined criteria are met. In such embodiments, in accordance with a determination that the predetermined criteria are not met, the computing environment optionally delays writing, to the destination node, the data indicated as not being a duplicate of a block of data stored on the destination node. In some embodiments, the predetermined criteria are based on at least one of the resource utilization of the source node and the resource utilization of the destination node.

Certain embodiments described herein can employ various computer-implemented operations involving data stored in computer systems. For example, these operations can require physical manipulation of physical quantities-usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general-purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), NVMe, Non-Volatile Memory, a CD (Compact Disc) (e.g., CD-ROM, CD-R, CD-RW, etc.), a DVD (Digital Versatile Disc), a Blu-Ray Disc, a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for resynchronizing data in a distributed storage system using asynchronous content-based data deduplication, the method comprising:
obtaining a plurality of representations corresponding respectively to a plurality of blocks of data stored on a source node;
performing a data identification step comprising:
sending a plurality of data pairs to a destination node, wherein the plurality of data pairs correspond to at least a portion of data to be replicated on the destination node, wherein each data pair in the plurality of data pairs includes: i) a logical address of a block of data from the plurality of blocks of data and ii) a corresponding representation of the block of data from the plurality of representations of the blocks of data;
for each logical address in the plurality of data pairs:
determining, by the destination node, whether the block of data associated with the respective logical address is a duplicate of data already stored on the destination node based on the representation of the block of data associated with the respective logical address;
in accordance with a determination that the block of data associated with the respective logical address is a duplicate of a block of data stored on the destination node, pointing the logical address to a physical address of the block of data stored on the destination node; and
in accordance with a determination that the block of data associated with the respective logical address is not a duplicate of a block of data stored on the destination node, storing an indication that the data corresponding to the respective logical address is not a duplicate of a block of data stored on the destination node; and
performing a writing step for non-duplicate data asynchronously from the data identification step, the writing step comprising:
sending, to the destination node, the logical addresses and the corresponding data indicated as not being a duplicate of a block of data stored on the destination node comprising sending a plurality of batches of logical address and corresponding data pairs, wherein sending the plurality of batches comprises:
selecting, by the source node, an initial batch based on a characteristic of the data being resynchronized, the initial batch having a batch size;
receiving batch heuristics from the destination node; and
determining whether to change the batch size for subsequent batches based on the received batch heuristics; and
writing the data received from the source node to corresponding physical addresses on the destination node and updating the received logical addresses to point to the corresponding physical addresses on the destination node.

2. The method of claim 1, further comprising, before writing the data indicated as not being a duplicate of a block of data stored on the destination node:
determining whether predetermined criteria are met, wherein the data indicated as not being a duplicate of a block of data stored on the destination node is written in accordance with a determination that the predetermined criteria are met; and
in accordance with a determination that the predetermined criteria are not met, delaying writing, to the destination node, the data indicated as not being a duplicate of a block of data stored on the destination node.

3. The method of claim 2, wherein the predetermined criteria are based on at least one of the resource utilization of the source node and the resource utilization of the destination node.

4. The method of claim 1, wherein the plurality of blocks of data stored on the source node are associated with respective components of a virtualized computing system, the method further comprising, before sending the plurality of data pairs to the destination node:
selecting the plurality of data pairs based on the component with which the blocks of data stored on the source node are associated.

5. The method of claim 1, further comprising, before sending the plurality of data pairs to the destination node:
selecting the plurality of data pairs based on memory utilization of the destination node.

6. The method of claim 5, wherein the number of data pairs in the selected plurality of data pairs is selected to be directly proportional to the memory utilization of the destination node.

7. The method of claim 1, further comprising, before sending the plurality of data pairs to the destination node:
selecting the plurality of data pairs based on a number of blocks of data previously determined to be a duplicate of data stored on the destination node.

8. The method of claim 7, wherein the number of data pairs in the selected plurality of data pairs is selected to be directly proportional to the number of blocks of data previously determined to be a duplicate of data stored on the destination node.

9. The method of claim 1,
wherein the plurality of representations corresponding respectively to the plurality of blocks of data stored on the source node include hashes of the respective blocks of data, and
wherein determining whether the block of data associated with the respective logical address is a duplicate of data stored on the destination node is based on whether the hash of the block of data associated with the respective logical address matches a hash of data stored on the destination node.

10. The method of claim 1, wherein the plurality of blocks of data stored on the source node are selected based on a determination that the plurality of blocks of data stored on the source node are copies of data previously stored on a failed node.

11. The method of claim 1, comprising:
sending, to the source node, by the destination node, and in response to a request by the source node, the logical addresses of the plurality of pairs determined to not be duplicates of blocks of data stored on the destination node.

12. The method of claim 11, wherein sending the logical addresses comprises searching the stored information to identify the logical addresses that include the indication that the logical address is not a duplicate of a data block of data stored on the destination node.

13. A non-transitory computer-readable storage medium storing one or more programs configured to be executed by one or more processors, the one or more programs including instructions for:

obtaining a plurality of representations corresponding respectively to a plurality of blocks of data stored on a source node;

performing a data identification step comprising:
- sending a plurality of data pairs to a destination node, wherein the plurality of data pairs correspond to at least a portion of data to be replicated on the destination node, wherein each data pair in the plurality of data pairs includes: i) a logical address of a block of data from the plurality of blocks of data and ii) a corresponding representation of the block of data from the plurality of representations of the blocks of data;
- for each logical address in the plurality of data pairs:
  - determining, by the destination node, whether the block of data associated with the respective logical address is a duplicate of data already stored on the destination node based on the representation of the block of data associated with the respective logical address;
  - in accordance with a determination that the block of data associated with the respective logical address is a duplicate of a block of data stored on the destination node, pointing the logical address to a physical address of the block of data stored on the destination node; and
  - in accordance with a determination that the block of data associated with the respective logical address is not a duplicate of a block of data stored on the destination node, storing an indication that the data corresponding to the respective logical address is not a duplicate of a block of data stored on the destination node; and performing a writing step for non-duplicate data asynchronously from the data identification step, the writing step comprising:
- sending, to the destination node, the logical addresses and the corresponding data indicated as not being a duplicate of a block of data stored on the destination node comprising sending a plurality of batches of logical address and corresponding data pairs, wherein sending the plurality of batches comprises:
  - selecting, by the source node, an initial batch based on a characteristic of the data being resynchronized, the initial batch having a batch size;
  - receiving batch heuristics from the destination node; and
  - determining whether to change the batch size for subsequent batches based on the received batch heuristics; and
- writing the data received from the source node to corresponding physical addresses on the destination node and updating the received logical addresses to point to the corresponding physical addresses on the destination node.

14. The computer-readable storage medium of claim 13, the one or more programs further including instructions for, before writing the data indicated as not being a duplicate of a block of data stored on the destination node:
- determining whether predetermined criteria are met, wherein the data indicated as not being a duplicate of a block of data stored on the destination node is written in accordance with a determination that the predetermined criteria are met; and
- in accordance with a determination that the predetermined criteria are not met, delaying writing, to the destination node, the data indicated as not being a duplicate of a block of data stored on the destination node.

15. The computer-readable storage medium of claim 14, wherein the predetermined criteria are based on at least one of the resource utilization of the source node and the resource utilization of the destination node.

16. The computer-readable storage medium of claim 13, wherein the plurality of blocks of data stored on the source node are associated with respective components of a virtualized computing system, the one or more programs further including instructions for, before sending the plurality of data pairs to the destination node:
- selecting the plurality of data pairs based on the component with which the blocks of data stored on the source node are associated.

17. The computer-readable storage medium of claim 13, the one or more programs further including instructions for, before sending the plurality of data pairs to the destination node:
- selecting the plurality of data pairs based on memory utilization of the destination node.

18. The computer-readable storage medium of claim 17, wherein the number of data pairs in the selected plurality of data pairs is selected to be directly proportional to the memory utilization of the destination node.

19. The computer-readable storage medium of claim 13, the one or more programs further including instructions for, before sending the plurality of data pairs to the destination node:
- selecting the plurality of data pairs based on a number of blocks of data previously determined to be a duplicate of data stored on the destination node.

20. The computer-readable storage medium of claim 19, wherein the number of data pairs in the selected plurality of data pairs is selected to be directly proportional to the number of blocks of data previously determined to be a duplicate of data stored on the destination node.

21. The computer-readable storage medium of claim 13,
- wherein the plurality of representations corresponding respectively to the plurality of blocks of data stored on the source node include hashes of the respective blocks of data, and
- wherein determining whether the block of data associated with the respective logical address is a duplicate of data stored on the destination node is based on whether the hash of the block of data associated with the respective logical address matches a hash of data stored on the destination node.

22. The computer-readable storage medium of claim 13, wherein the plurality of blocks of data stored on the source node are selected based on a determination that the plurality of blocks of data stored on the source node are copies of data previously stored on a failed node.

23. A computer system comprising:
- one or more processors; and
- memory storing one or more programs configured to be executed by the one or more processors, the one or more programs including instructions for:
  - obtaining a plurality of representations corresponding respectively to a plurality of blocks of data stored on a source node;
  - performing a data identification step comprising:
    - sending a plurality of data pairs to a destination node, wherein the plurality of data pairs correspond to at least a portion of data to be replicated on the destination node, wherein each data pair in the plurality of data pairs includes: i) a logical address of a block of data from the plurality of blocks of data and ii) a corresponding representation of the block of data from the plurality of representations of the blocks of data;
for each logical address in the plurality of data pairs:
determining, by the destination node, whether the block of data associated with the respective logical address is a duplicate of data already stored on the destination node based on the representation of the block of data associated with the respective logical address;
in accordance with a determination that the block of data associated with the respective logical address is a duplicate of a block of data stored on the destination node, pointing the logical address to a physical address of the block of data stored on the destination node; and
in accordance with a determination that the block of data associated with the respective logical address is not a duplicate of a block of data stored on the destination node, storing an indication that the data corresponding to the respective logical address is not a duplicate of a block of data stored on the destination node; and
performing a writing step for non-duplicate data asynchronously from the data identification step, the writing step comprising:
sending, to the destination node, the logical addresses and the corresponding data indicated as not being a duplicate of a block of data stored on the destination node comprising sending a plurality of batches of logical address and corresponding data pairs, wherein sending the plurality of batches comprises:
selecting, by the source node, an initial batch based on a characteristic of the data being resynchronized, the initial batch having a batch size;
receiving batch heuristics from the destination node; and
determining whether to change the batch size for subsequent batches based on the received batch heuristics; and
writing the data received from the source node to corresponding physical addresses on the destination node and updating the received logical addresses to point to the corresponding physical addresses on the destination node.

24. The system of claim 23, the one or more programs further including instructions for, before writing the data indicated as not being a duplicate of a block of data stored on the destination node:
determining whether predetermined criteria are met, wherein the data indicated as not being a duplicate of a block of data stored on the destination node is written in accordance with a determination that the predetermined criteria are met; and in accordance with a determination that the predetermined criteria are not met, delaying writing, to the destination node, the data indicated as not being a duplicate of a block of data stored on the destination node.

25. The system of claim 24, wherein the predetermined criteria are based on at least one of the resource utilization of the source node and the resource utilization of the destination node.

26. The system of claim 23, wherein the plurality of blocks of data stored on the source node are associated with respective components of a virtualized computing system, the one or more programs further including instructions for, before sending the plurality of data pairs to the destination node:
selecting the plurality of data pairs based on the component with which the blocks of data stored on the source node are associated.

27. The system of claim 23, the one or more programs further including instructions for, before sending the plurality of data pairs to the destination node:
selecting the plurality of data pairs based on memory utilization of the destination node.

28. The system of claim 27, wherein the number of data pairs in the selected plurality of data pairs is selected to be directly proportional to the memory utilization of the destination node.

29. The system of claim 23, the one or more programs further including instructions for, before sending the plurality of data pairs to the destination node:
selecting the plurality of data pairs based on a number of blocks of data previously determined to be a duplicate of data stored on the destination node.

30. The system of claim 29, wherein the number of data pairs in the selected plurality of data pairs is selected to be directly proportional to the number of blocks of data previously determined to be a duplicate of data stored on the destination node.

31. The system of claim 23,
wherein the plurality of representations corresponding respectively to the plurality of blocks of data stored on the source node include hashes of the respective blocks of data, and
wherein determining whether the block of data associated with the respective logical address is a duplicate of data stored on the destination node is based on whether the hash of the block of data associated with the respective logical address matches a hash of data stored on the destination node.

32. The system of claim 23, wherein the plurality of blocks of data stored on the source node are selected based on a determination that the plurality of blocks of data stored on the source node are copies of data previously stored on a failed node.

* * * * *